(12) United States Patent
Schalk et al.

(10) Patent No.: US 8,625,257 B2
(45) Date of Patent: Jan. 7, 2014

(54) PLUG-IN SYSTEM

(75) Inventors: Adelbert Schalk, Wutöschingen (DE); Fritz Ehrensperger, Marthalen (CH)

(73) Assignee: ABB Schweiz AG, Baden (CH)

( * ) Notice: Subject to any disclaimer, the term of this patent is extended or adjusted under 35 U.S.C. 154(b) by 216 days.

(21) Appl. No.: 13/311,172

(22) Filed: Dec. 5, 2011

(65) Prior Publication Data

US 2012/0142202 A1  Jun. 7, 2012

(30) Foreign Application Priority Data

Dec. 3, 2010 (EP) ..................... 10193709

(51) Int. Cl.
*H02B 1/20* (2006.01)
(52) U.S. Cl.
USPC ........... 361/656; 361/637; 361/643; 361/645; 361/652
(58) Field of Classification Search
None
See application file for complete search history.

(56) References Cited

U.S. PATENT DOCUMENTS

| | | | | |
|---|---|---|---|---|
| 2,790,113 A * | 4/1957 | Brown | ........................... | 361/655 |
| 2,980,824 A * | 4/1961 | Kobryner | ...................... | 361/627 |
| 3,273,022 A * | 9/1966 | McRoberts | .................... | 361/646 |
| 4,931,902 A * | 6/1990 | Cole | ............................. | 361/635 |
| 5,519,175 A * | 5/1996 | Cole | ......................... | 174/149 B |
| 5,973,409 A * | 10/1999 | Neibecker et al. | ........... | 307/10.1 |
| 7,619,896 B2 * | 11/2009 | Yamashita et al. | ............ | 361/720 |
| 7,706,134 B2 * | 4/2010 | Ewing et al. | .................. | 361/622 |
| 8,128,430 B2 * | 3/2012 | Diessel | ......................... | 439/507 |
| 8,488,303 B2 * | 7/2013 | De La Reza et al. | ......... | 361/641 |

FOREIGN PATENT DOCUMENTS

| | | |
|---|---|---|
| DE | 32 38 483 A1 | 3/1984 |
| EP | 0 229 590 A1 | 7/1987 |
| EP | 0 753 916 A2 | 1/1997 |
| EP | 1 139 531 A2 | 10/2001 |
| GB | 2 305 008 A | 3/1997 |
| GB | 2 351 852 A | 1/2001 |

OTHER PUBLICATIONS

Search Report issued on Apr. 21, 2011, by European Patent Office for Application No. 10193709.2.

* cited by examiner

*Primary Examiner* — Boris Chervinsky
(74) *Attorney, Agent, or Firm* — Buchanan Ingersoll & Rooney PC

(57) ABSTRACT

Exemplary embodiments are directed to a plug-in system having a lower part, on which busbars can be arranged, and an upper part which is made of electrically insulating material and is releasable from the lower part in a non-destructive manner on a top side arranged opposite the underside. Protective devices having electrical contacts can be arranged on the plug-in system. The upper part has openings through which the electrical contacts of the protective devices can make direct contact with the busbars. The openings are configured in such a manner that the plug-in system is shockproof to IP XXB. The upper part and lower part are latchable into one another or are screwable to one another in such a manner that the upper part is releasable from the lower part only from the underside of the plug-in system.

20 Claims, 9 Drawing Sheets

PLUG-IN SYSTEM

RELATED APPLICATION

This application claims priority under 35 U.S.C. §119 to European Patent Application No. 10193709.2 filed in Europe on Dec. 3, 2010, the entire content of which is hereby incorporated by reference in its entirety.

FIELD

The exemplary embodiments relate to plug-in systems, such as plug-in systems for protective devices.

BACKGROUND

Plug-in systems can be used to plug protective devices onto the plug-in system in a quick and simple manner and to thereby avoid complicated electrical contact with the supply.

EP 0 229 590 describes a plug-in system having three main busbars, a neutral conductor and two auxiliary busbars. A wide variety of protective devices, for example circuit-breakers, and accessories can be plugged onto such a plug-in system.

EP 0 735 916 A2 discloses a plug-in system having a lower part on which busbars are arranged. An adapter part can be suspended from the lower part at a pivot point and tilted onto the lower part to make contact with the busbars. The adapter part is locked by a latching lug which latches into a further latching lug in the lower part. A covering plate into which circuit-breakers are clamped can be placed onto the adapter part. A microswitch which is closed as soon as the adapter part has been folded onto the lower part is additionally also situated on the adapter part. The switch can ensure that the adapter part cannot be removed under load.

However, in addition to the lower part on which the busbars can be situated, the adapter part should also have electrical contacts as well as the microswitch and lines since contact is made with the switches on the adapter part. The system thus contains a multiplicity of electrical parts and a multiplicity of components, which can have an adverse effect on the susceptibility to faults and costs of the system. Shock protection is at best provided during operation. If the adapter part is removed for installation, the busbars are open and there is a risk of the installer coming into contact with the live busbars.

The adapter part also has large openings into which the contacts are each completely inserted, and so there is an increased risk of direct contact by the installer. Therefore, there is a risk of contact if the covering plate is removed and the microswitch on the adapter plate is thus still closed.

Another plug-in system which is known from the prior art contains busbars to which plates made of electrically insulating material can be fitted as shock protection in order to cover unused plug-in locations of the system and thus make the locations shockproof. These plates are plugged, in the same manner as the protective devices, but alternatively to the latter, onto the plug-in locations and can occupy one or more plug-in locations. The disadvantage of this system is that the system can be operated with or without the insulating plates, without the system detecting this, and thus there is no reliable shock protection since the system does not detect whether there are still free plug-in locations. In addition, the insulating plates should be assigned according to the number of free plug-in locations, that is to say insulating plates of different widths should be present. During the replacement of a protective device, these insulating plates may no longer constitute any protection since, after a protective device has been removed, open contact areas to the busbars are present in its place.

However, the specifications imposed on the availability of the electrical supply are increasing. More and more, maintenance and expansion work has to be carried out on low-voltage installations under time pressure and therefore under voltage in order to keep the unavailability times low (banks, insurance companies, telecommunications, airports, etc.).

GB 2 351 852 A describes a busbar system in which circuit-breakers can be plugged onto two mutually opposite sides of the bus system. A cover plate establishes shock protection by being plugged onto the busbars themselves or onto spacers between the busbars. In this case, the cover plate covers the busbars, with the result that the circuit-breakers laterally make contact with the busbars. However, the circuit-breakers can be plugged on with and without a cover plate and, even when the cover plate has been plugged on, there is no shock protection if the protective devices are removed. Although an insulating plate can be additionally plugged on for this purpose, this plate also provides only a limited degree of safety since operation even without an insulating plate is possible.

EP 1 139 531 A2 describes a system for connecting a plurality of plug-on circuit-breakers. A cover plate which can be optionally plugged on covers the busbars with which contact is made via slots in the cover plate. There is finger test safety when the plate has been plugged on. The electrical connections between the protective devices and the busbars can be produced via connecting parts which have different lengths according to the position of the busbar. The connecting parts can be routed to the outside by the busbar and the protective device makes contact with said parts there.

The systems described above have the disadvantage that the plates, which are intended to ensure shock protection, can be easily removed, with the result that an engineer working on the system can remove the protection without any problems and can then come into contact with live parts. Moreover, in these systems, the protective devices can be installed without protection, with the result that the plates do not provide any reliable protection.

DE 32 38 483 A1 shows a busbar system which provides shock protection only outside the connection points, that is to say there is no shock protection at the connection points.

SUMMARY

An exemplary plug-in system for a plurality of protective devices having electrical contacts is disclosed. The plug-in system, comprising: a lower part on an underside, wherein the lower part includes busbars; and an upper part on a top side arranged opposite the underside, wherein the upper part is made of electrically insulating material and is releasable from the lower part in a non-destructive manner, wherein the upper part has openings through which the electrical contacts of the protective devices make direct contact with the busbars, and the openings enable the plug-in system to be shockproof to IP XXB on the top side, and wherein the upper part and lower part are latchable into one another or are screwable to one another in such a manner that the upper part is releasable from the lower part only from the underside of the plug-in system.

An upper part of a plug-in system for a plurality of protective devices having electrical contacts is disclosed, wherein the plug-in system includes a lower part on an underside and the lower part includes busbars, the upper part comprising: electrically insulating material, wherein the upper part is latchable into the lower part or is screwable to the lower part, such that the upper part is releasable from the lower part only from the underside of the plug-in system, wherein the upper part is on a top side of the plug-in system arranged opposite the underside, wherein the upper part has openings through which the electrical contacts of the protective devices make direct contact with the busbars, and the openings enable the plug-in system to be shockproof to IP XXB on the top side, and wherein the upper part is releasable from the lower part in a non-destructive manner.

DESCRIPTION OF THE DRAWINGS

Embodiments of the invention are explained in detail below using the drawing, in which, in a purely diagrammatic manner.

Figure 1:
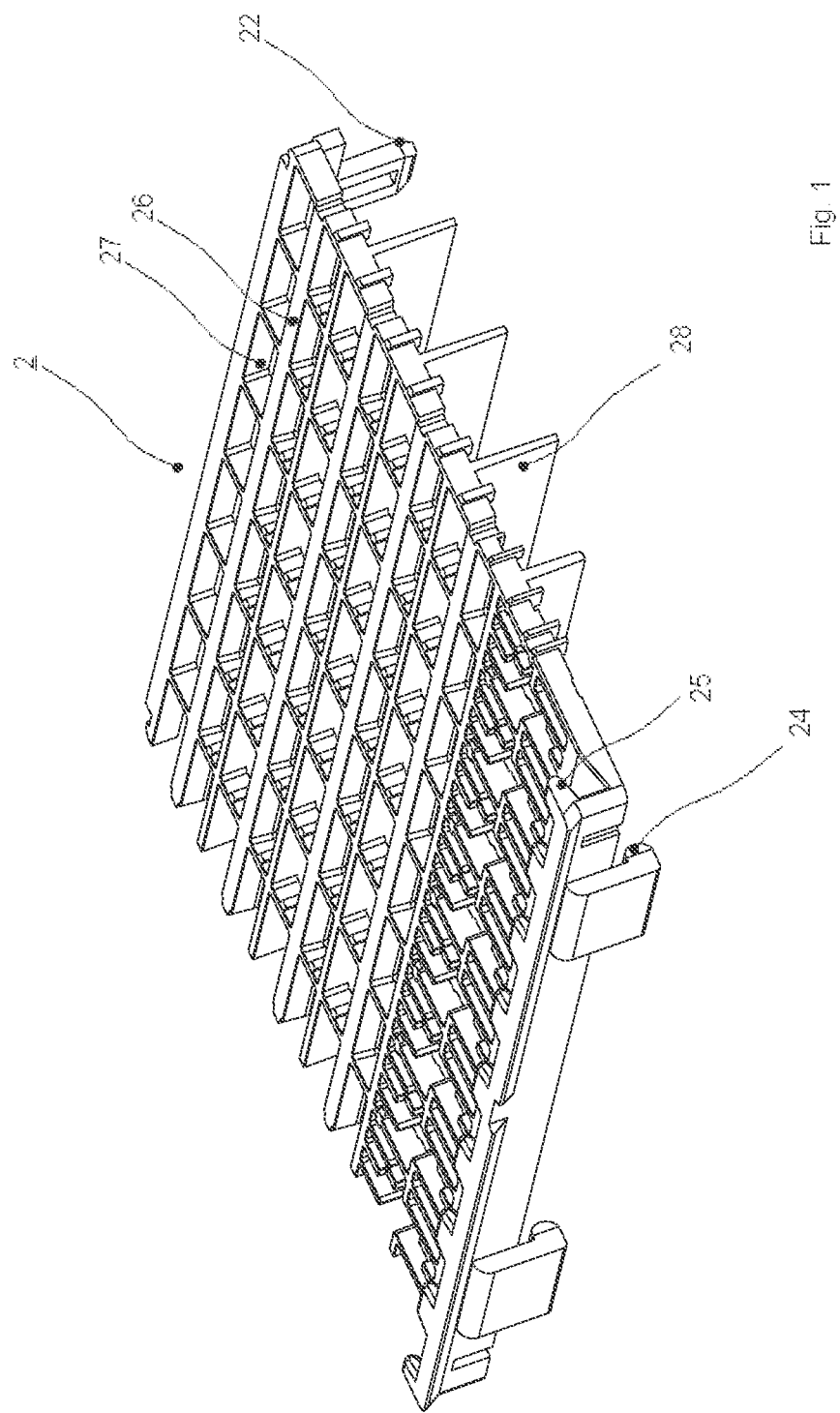
FIG. 1 shows an upper part for a plug-in system in a plan view of the top side in accordance with an exemplary embodiment of the present disclosure.

The reference symbols used in the drawing and their meaning are summarized in the list of reference symbols. In principle, the same parts are provided with the same reference symbols in the figures. The embodiments described represent the subject matter of the invention by way of example and have no restrictive effect.

DETAILED DESCRIPTION

Exemplary embodiments of the present disclosure provide a plug-in system having shock protection which is established during operation but also during maintenance, repair or expansion work on the system, in which case, in order to increase safety, work on the busbars is intended to be possible only in the deenergized state.

In an exemplary embodiment, the plug-in system has a lower part on an underside, on which part busbars can be arranged, and an upper part which is made of electrically insulating material and is releasable from the lower part in a non-destructive manner on a top side arranged opposite the underside. The upper part, on which protective devices having electrical contacts can be arranged, has openings through which the electrical contacts of the protective devices can make direct contact with the busbars of the plug-in system. The openings can be configured in such a manner that the plug-in system is shockproof to IP XXB (EN 60529) on all sides. In this case, the upper part establishes shock protection on the top side. Shockproof shall mean that the plug-in system is safe from contact, i.e. it is insulated or not exposed and thus guarded against accidental contact.

With regard to shock protection, clearances and creepage paths as well as switching and fault arc safety, the upper part can be designed in such a manner that both finger safety to IP XXB (EN 60529) and switching and fault arc safety are provided. The latter is provided on account of the fact that no short circuit can arise during intended use and in the case of foreseeable misuse. This also includes fault arc safety with respect to a tool or other metal parts falling down and to wires which have been cut.

As a result of the upper part, the plug-in system is covered in such a manner that an installer cannot inadvertently come into contact with the busbars. Since the protective devices in the plug-in system can be plugged on through the upper part for the electrical contacts to make contact with the busbars, the practice of plugging on the protective devices also prevents the upper part arranged between the lower part and the protective devices from being able to be removed.

Furthermore, with the upper part installed, shock protection is provided in the entire plug-in system, that is to say free plug-in locations are not only covered but protection is also provided when a protective device is removed for maintenance or installation.

The system can be simple to implement since no additional adapters are needed to make electrical contact with the protective devices, but rather the busbars arranged on the lower part can make direct contact with the protective devices through the upper part.

The upper part can provide reliable protection because, unlike in EP 0 735 916 A2, it does not include any electrical elements itself but rather is a purely mechanical part, which does not have any electrically conductive parts, and thus has a low susceptibility to faults.

In accordance with a preferred embodiment, the upper part is releasable from the lower part only from the underside of the plug-in system. This further increases the safety of the system because this ensures that, if the installer wishes to remove the upper part, he should first remove the plug-in system and the busbars are thus deenergized in the event of maintenance or installation.

In accordance with another preferred embodiment, the upper part has additional means which can be used to plug the protective devices onto the plug-in system only when the upper part is installed and thus only when the busbars are covered. In this embodiment, it is not possible to plug on the protective devices without the upper part. The advantage of such a configuration is that the safety of the system is increased further because it is not possible to plug on the protective devices without the shock protection ensured by the upper part.

Figure 2:
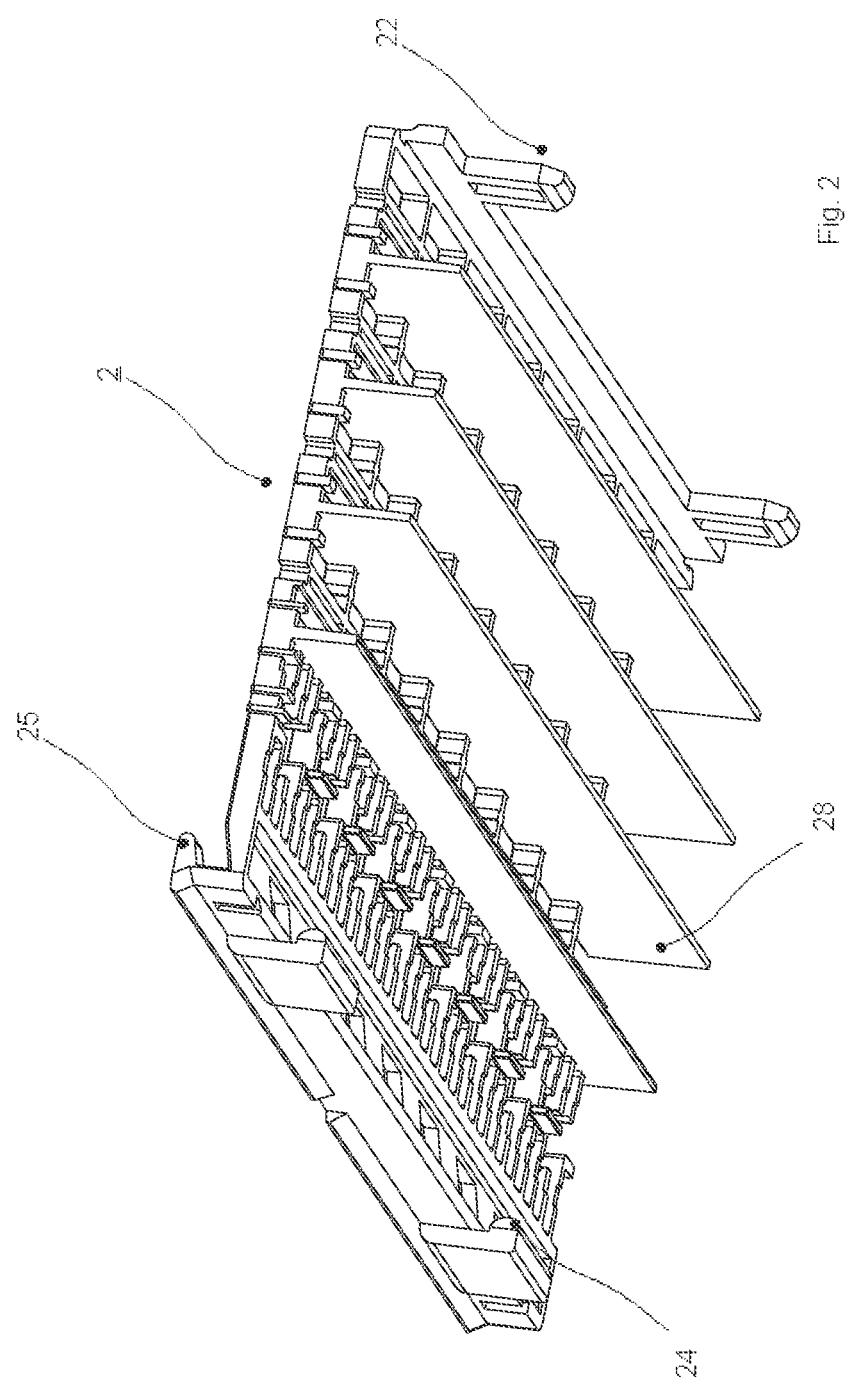
FIG. 2 shows an upper part for a plug-in system from below in accordance with an exemplary embodiment of the present disclosure.
Figure 3:
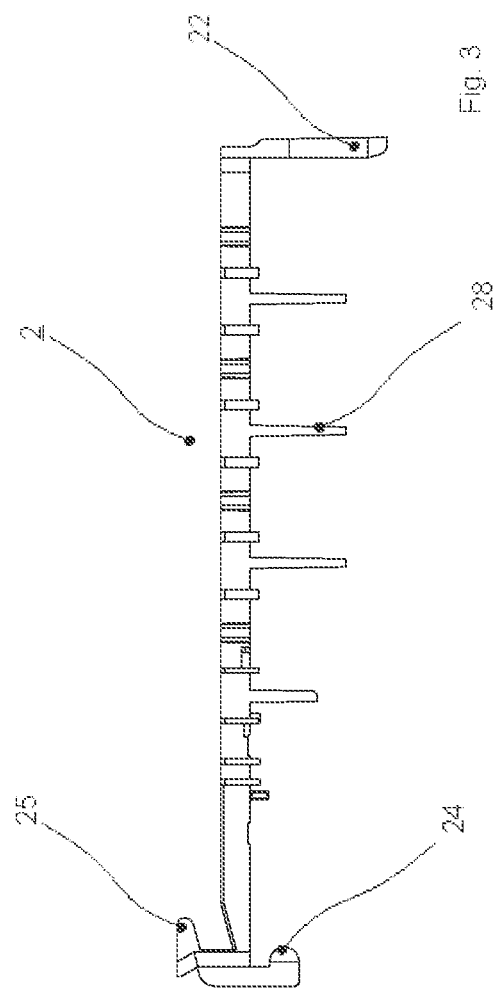
FIG. 3 shows an upper part for a plug-in system from the side in accordance with an exemplary embodiment of the present disclosure.

FIG. 1 shows an upper part for a plug-in system in a plan view of the top side in accordance with an exemplary embodiment of the present disclosure. As shown in FIG. 1, an upper part 2 for a plug-in system 1 in an oblique plan view, on which protective devices 4 having electrical contacts 42 (illustrated in FIGS. 7 and 8) can be arranged. FIG. 2 shows an upper part for a plug-in system from below in accordance with an exemplary embodiment of the present disclosure. FIG. 3 shows an upper part for a plug-in system from the side in accordance with an exemplary embodiment of the present disclosure. The plug-in system 1 has, for example as busbars, main busbars 52, 52', 52" and, depending on the application of the system, also neutral conductors 56 or auxiliary busbars 54, 54'. The upper part 2 has openings 27 through which the electrical contacts 42 of the protective devices can make direct contact with the busbars 5. The openings 27 are configured in such a manner that the plug-in system 1 on the top side 11 is shockproof to IP XXB. Shockproof to IP XXB (EN 60529) means that a standardized test finger can penetrate up to 80 mm into the item to be tested without touching hazardous parts.

Figure 4:
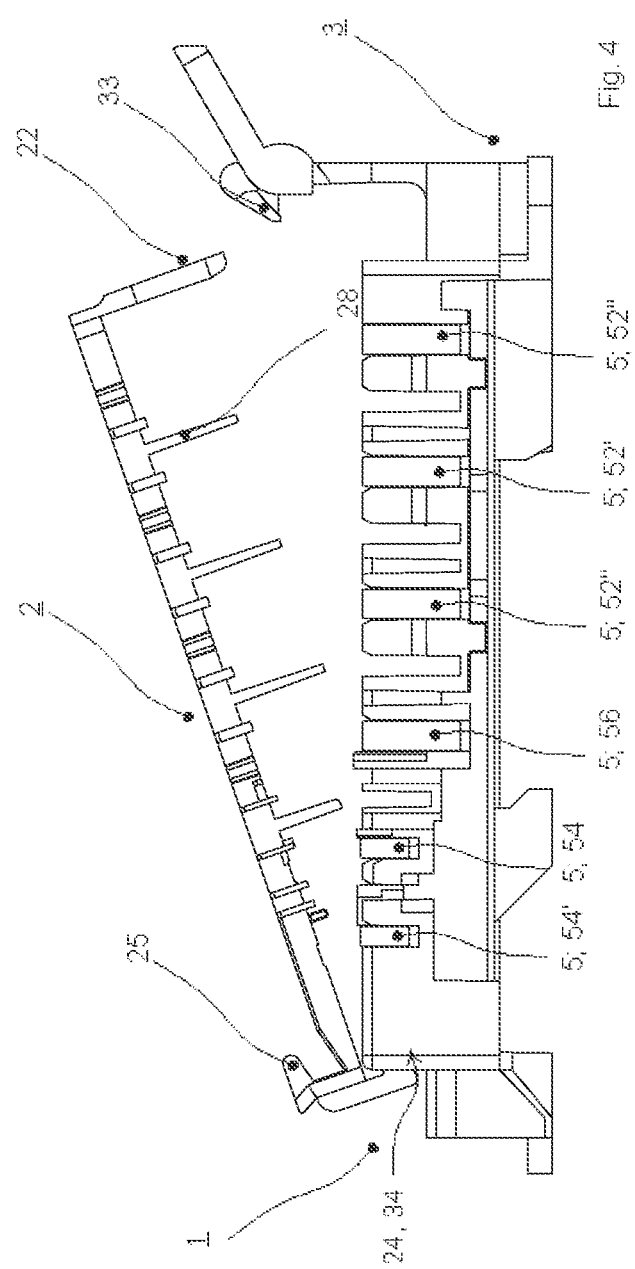
FIG. 4 shows a side view of a plug-in system having a lower part and an upper part in the open state in accordance with an exemplary embodiment of the present disclosure.

As shown in FIG. 4, the upper part 2 has first webs 26 in the plane of the top side 11, with the result that at least one of the busbars 5 is at least partially coverable. The protective devices 4 can make contact with the busbars either from above or from the side. When the busbars are covered, contact can be made with the busbars only from the side. An electrical contact suitable for this purpose is known from EP 0229590. In this case, the protective device 4 has electrical contacts 42 which are convexly bent in such a manner that they touch the busbars 5 from the side when the protective device 4 is plugged on. The protective device 4 often also has contacts which are bent in a U-shaped manner with the opening toward the busbar and are bent slightly inward in the region of the two lateral, mutually parallel parts of the "U" (e.g., tulip or lyre shape), with the result that contact is made with the busbar from both sides.

It is also possible for the busbars 5 not to be covered but rather for the first webs 26 to be arranged between the busbars, thus ensuring shock protection. In this case, the electrical contacts 42 of the protective devices 4 can make contact with the busbars from above.

The upper part 2 may furthermore also have second webs 28 which are arranged in a plane perpendicular to the plane of the first webs 26. These webs 28 are arranged, as plates, between two respective adjacent busbars 5 which are thus separated by the second webs 28. This improves the rigidity of the upper part as well as clearances and creepage paths between the busbars 5.

The upper part 2 and the lower part 3 of a plug-in system 1 are connected to one another in such a manner that they can be released from one another in a non-destructive manner. This can be desirable for installation, maintenance or repair work.

Figure 5:
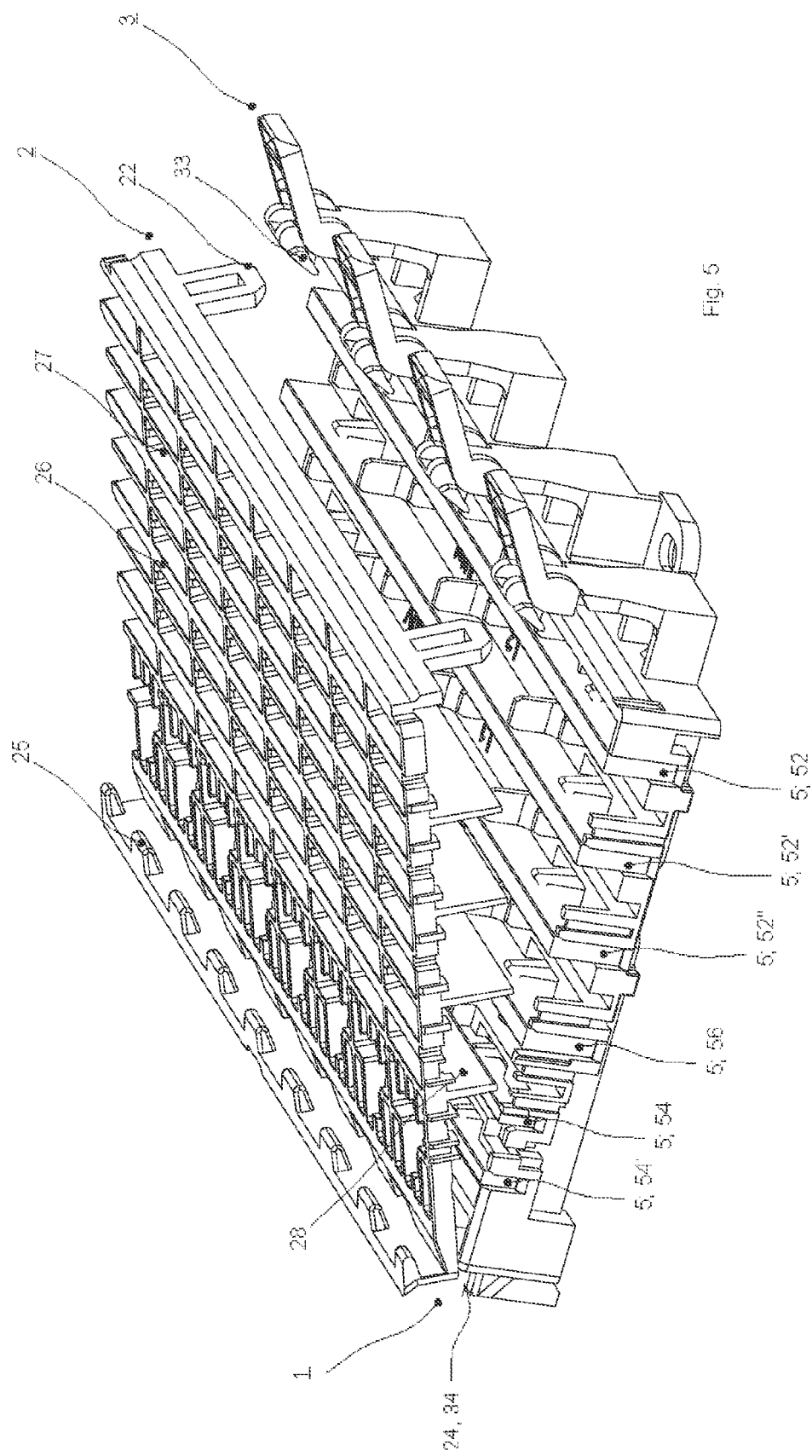
FIG. 5 shows a view from above a plug-in system having a lower part and an upper part in the open state in accordance with an exemplary embodiment of the present disclosure.
Figure 6:
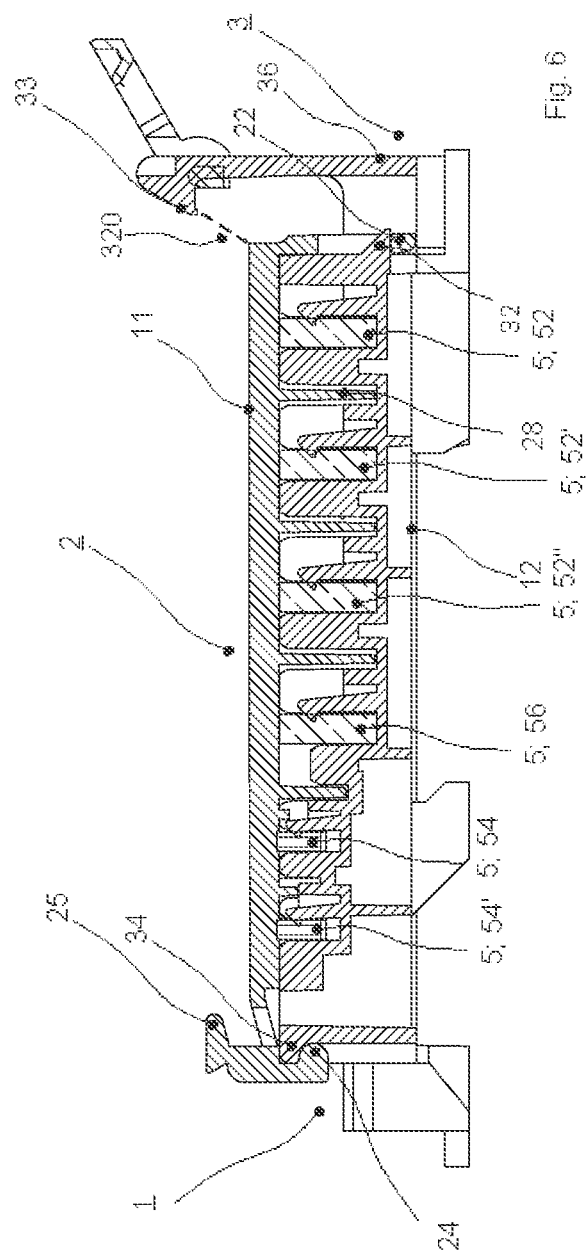
FIG. 6 shows a section view of a plug-in system having a lower part and an upper part in the closed state in accordance with an exemplary embodiment of the present disclosure.

FIG. 4 shows a side view of a plug-in system having a lower part and an upper part in the open state in accordance with an exemplary embodiment of the present disclosure. FIG. 5 shows a view from above a plug-in system having a lower part and an upper part in the open state in accordance with an exemplary embodiment of the present disclosure. FIG. 6 shows a section view of a plug-in system having a lower part and an upper part in the closed state in accordance with an exemplary embodiment of the present disclosure.

FIGS. 4 to 6 show the entire plug-in system 1 in different stages of construction with a lower part 3 on an underside 12, on which part busbars 5 are arranged, and with an upper part 2 which is made of electrically insulating material and is releasable from the lower part 3 in a non-destructive manner on a top side 11 arranged opposite the underside 12. FIGS. 4-6 shows examples of how the upper part 2 and the lower part 3 can be releasably connected to one another. There can be at least two connections on opposite lateral sides which are perpendicular to the top side 11. At least one of the connections can be a latching connection, while the other connection may likewise be a latching connection or a tilting connection. In the case of the latching connection, a latching-in element latches into a latching-in area. For release, a mechanical force needs to be applied in order to release the two parts which have been latched into one another from one another. In the case of the tilting connection, rotation of the parts with respect to one another is sufficient for release.

FIGS. 4 to 6 show another exemplary embodiment in which the upper part 2 and the lower part 3 latch into one another. For this purpose, the upper part 2 may have a first latching-in element 22 which is latchable to a second latching-in element 32 of the lower part. For example, the first latching-in element 22 may be in the form of a clip which snaps into a second latching-in element 32 of the lower part, which latching-in element is in the form of a latching-in lug. The latching-in elements overlap in the latched-in state and must be pushed past one another in order to release the connection. However, both latching-in elements 22, 32 may also be in the form of latching-in lugs.

Furthermore, the latching-in operation may also be carried out using a further element, for example in the form of a clip into which latching-in elements in the form of latching-in lugs on the upper and lower parts 2, 3 are hooked. A latching-in lug is hooked into the clip connected to the other latching-in lug and is thus latched in. A further latching-in element could also likewise be provided with two latching-in lugs, each latching-in lug of this further element latching to the latching-in lugs of the upper and lower parts.

Alternatively, the upper and lower parts may also be screwed to one another. It should be understood further alternative releasable connections or combinations of different releasable connections can be well known to a person skilled in the art and are intended to be concomitantly included in exemplary embodiments as desired.

In another exemplary embodiment, the upper part 2 may have a first tilting element 24, for example in the form of a rounded thickened portion (cylinder segment) which is on a lateral side with respect to the top side 11 of the upper part 2. A second tilting element 34 (for example in the form of a thickened portion or else a tapered portion in or on which the first tilting element 24 can be placed) can be arranged on the same lateral side in the lower part 3. As shown in the side view in FIG. 6, both tilting elements 24, 34 are combined and the upper part 2 can now be tilted with respect to the lower part 3 at a pivot point, with the result that the parts 2, 3 can be closed. FIG. 5 shows the plug-in system in an oblique plan view in the open state, the upper and lower parts 2, 3 already having been combined at their tilting elements 24, 34.

As shown in FIG. 6, the first and second latching-in elements 22, 32 can be arranged on a side opposite the lateral side on which the tilting elements 24, 34 are arranged, with the result that the upper part 2 is first of all closed with the lower part 3 and said parts are then latched into one another.

Figure 9:
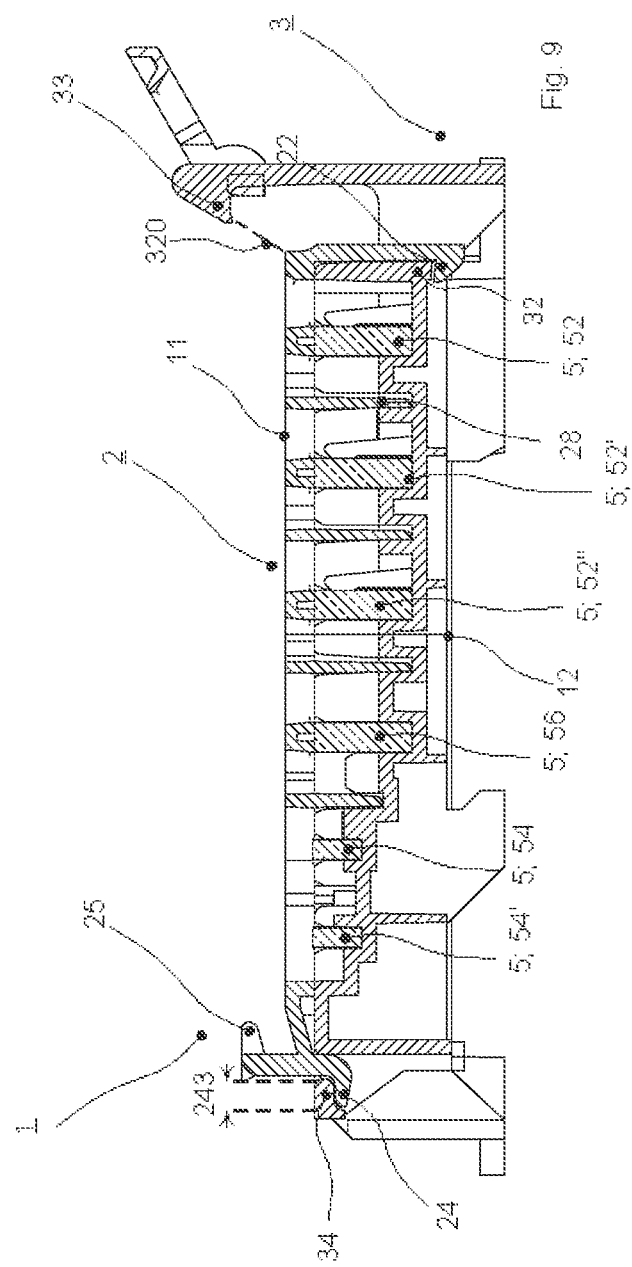
FIG. 9 shows a section view of another plug-in system having a lower part and an upper part in the closed state in accordance with an exemplary embodiment of the present disclosure.

FIG. 9 shows a section view of another plug-in system having a lower part and an upper part in the closed state in accordance with an exemplary embodiment of the present disclosure. As shown in FIG. 9, the first tilting element 24 of the upper part 2 can be configured in such a manner that it projects into the second tilting element 34 to such an extent that, for installation, the upper part 2 should first be compulsorily hooked, at its first tilting element 24, into the lower part 3 at the second tilting element 34 of the latter and then should be closed before it can then be latched to the lower part 3 (FIG. 9). For this purpose, the first tilting element 24 may overlap the second tilting element 34 in the assembled state in a lateral plane parallel to the top side 11, for example by an overlapping region 243 of 3 mm or more than 5 mm. As a result of such a large overlap, the tilting operation must be carried out before the latching-in operation.

In another exemplary embodiment, the latching-in elements 22, 32 are designed such that the upper part 2 is releasable from the lower part 3 only from the underside 12 of the plug-in system 1. As shown in FIG. 6, the latching-in lug 32 of the lower part can be fitted to the underside of the lower part 3. In order to release the connection, the clip 22 should be removed from the lower part from the underside 12 at least by the distance by which the latching-in lug 32 projects from the lower part and must then be pushed away from the latching-in lug 32.

Figure 7:
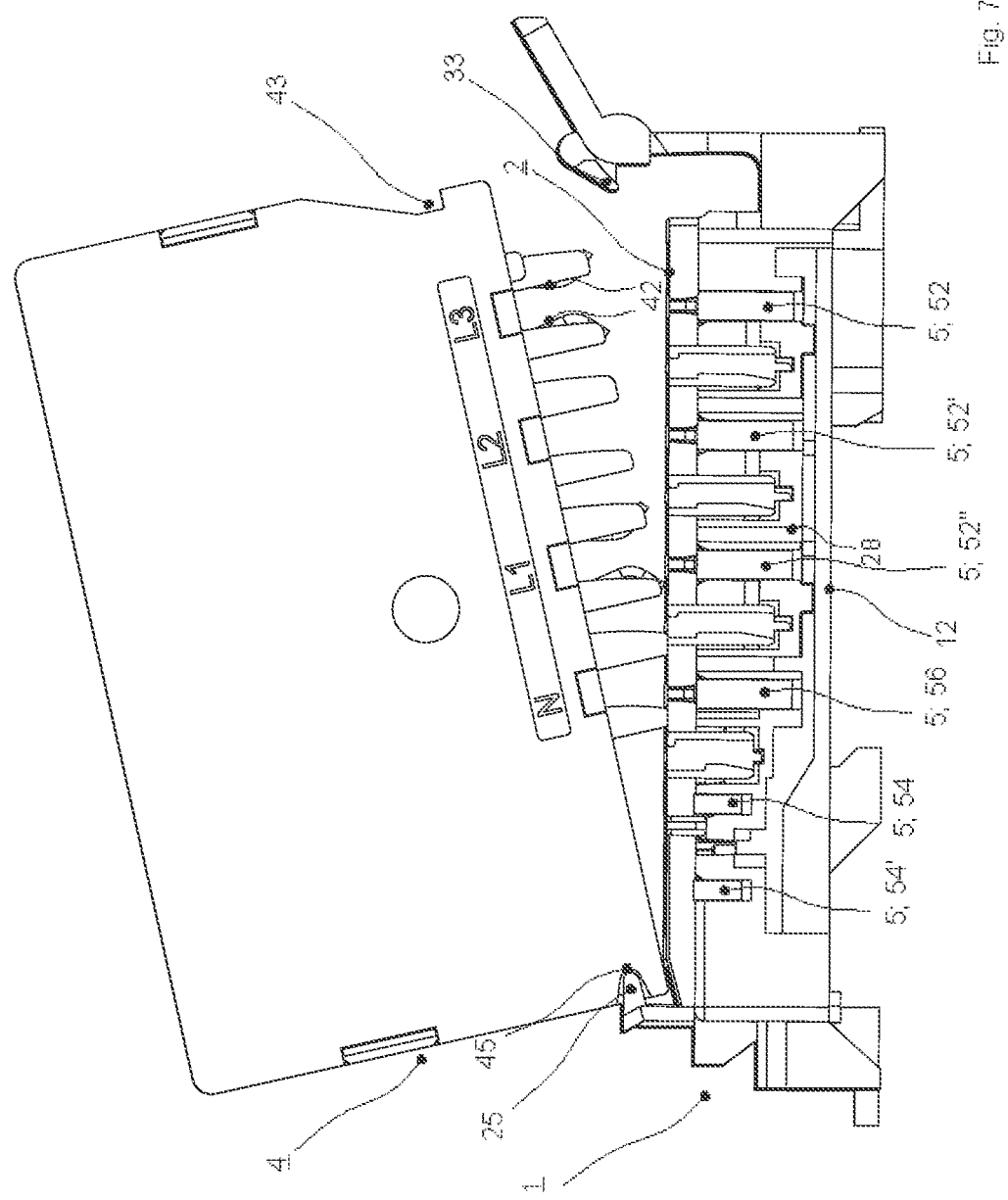
FIG. 7 shows a side view of a plug-in system having a protective device in the open state in accordance with an exemplary embodiment of the present disclosure.

FIG. 7 shows a side view of a plug-in system having a protective device in the open state in accordance with an exemplary embodiment of the present disclosure. As shown in FIG. 7, protective devices 4 can be plugged onto the plug-in system 1. It is possible for the upper part 2 and the lower part 3 to be assembled and for the protective devices 4 to only then be plugged on. Alternatively, the protective devices 4 may first be plugged onto the upper part 2 and the latter can then be hooked or folded onto the lower part 3 and then latched in.

In order to releasably connect a protective device 4 to the upper part 2, the upper part 2 may have a third tilting element 25 and the protective device 4 may have a fourth tilting element 45. Like in the case of the tilting connection between the upper part 2 and the lower part 3, these tilting elements 25, 45 interact in such a manner that the protective device 4 is tiltable with respect to the upper part 2. The lower part 3 may have a third latching-in element 33 and the protective device 4 may have a fourth latching-in element 43, the third and fourth latching-in elements 33, 43 being latchable to one another. In this embodiment, the protective device 4 is thus closed with the upper part 2 on one side and is latched to the lower part 3 on the other side.

However, instead of being latched to the lower part, the protective device 4 could also likewise be connected only to the upper part 2 and could not have any direct connection to the lower part. For this purpose, the protective device 4 may have, for example, a sixth latching-in element and the upper part 2 may have a fifth latching-in element which latch to one another. As already described above, the protective device 4 may also be closed with and/or latched to the upper part in this case.

Figure 8:
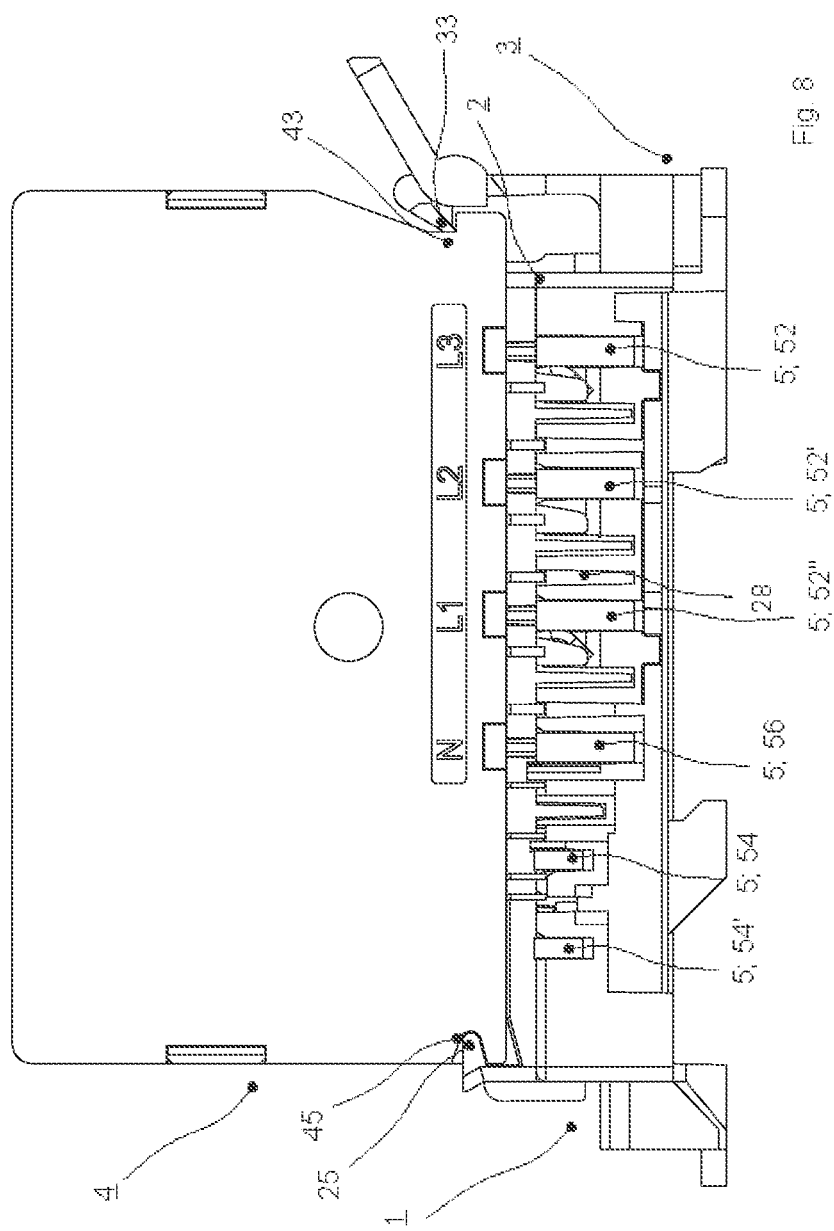
FIG. 8 shows a side view of a plug-in system having a protective device in the closed state in accordance with an exemplary embodiment of the present disclosure.

FIG. 8 shows a side view of a plug-in system having a protective device in the closed state in accordance with an exemplary embodiment of the present disclosure. FIG. 8 shows the plug-in system with a protective device 4 which has been plugged on and has been closed with the upper part 2 (tilting elements 25, 45) and has been latched to the lower part 3 (latching-in elements 33, 43).

Alternatively, the protective device 4 and the lower part 3 may also have tilting elements and latching-in elements or else only latching-in elements for mutual latching-in and closing, with the result that the protective device 4 is connected only to the lower part 3 such that it is releasable in a non-destructive manner. In this case too, it is possible for the protective device 4 to likewise have tilting elements with the lower part 3 and for a latching-in operation to be carried out using latching-in elements on the upper part 2 and the protective device 4.

In another exemplary embodiment, the protective devices 4 are tightly screwed on the upper part 2 and/or lower part 3.

All of the tilting or latching-in elements needed for a protective device 4 for latching-in or tilting can be arranged in a plane perpendicular to the busbars 5 and to the top side 11. Moreover, it should be understood that any combination of the first, second, third, fourth, fifth, and sixth latching-in elements and the first, second, third, fourth, fifth, and sixth tilting elements can be used for an appropriate configuration of an exemplary plug-in system as desired.

FIG. 6 shows that the upper part 2 and the second latching-in element 32 can be at a distance 320, for example, which is at most 5 mm or less than 2 mm, for example, and more preferably 3 mm. Distance should be understood as meaning the minimum distance between the upper part 2 and the lower part 3 in a plane perpendicular to the top side 11 and to the busbars 5, in which plane the second latching-in element 32 is arranged. The distance should be determined in the region between the top side 11 and the second latching-in element 32, for example in the region through which a tool would have to be guided if the wish were to release the latching-in from the top side 11. This distance is thus the smallest opening which would have to be overcome by a tool when attempting to release the connection from the top side 11 using the tool.

With such a short distance 320, for example, additionally it can be more difficult, to release the latching between the upper part 2 and the lower part 3 from the top side 11 using tools.

This may be achieved, for example, by the lower part 3 having a lateral edge 36 (that is to say perpendicular to the underside 12) which is at a distance from the second latching-in element 32, with the result that the first latching-in element 22 is guided through in the intermediate space between the edge 36 and the second latching-in element 32 in order to latch to the second latching-in element 32 (FIG. 6). The minimum distance between the upper part 2 and the lower part 3 in a region between the second latching-in element 32 and the edge 36, that is to say the region into which a tool would have to be inserted in order to release the latching-in connection, can be between 8 mm and 5 mm, for example, and more preferably 6 mm.

The third latching-in element 33 or possibly a tilting element of the lower part for connection to the protective device 4 may also be arranged on the edge. This also produces a gap in which the first latching-in element 22 can be inserted as far as the second latching-in element 32. This gap can also be small according to the invention as a distance 320.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| LIST OF REFERENCE SYMBOLS | |
|---|---|
| 1 | Plug-in system |
| 11 | Top side |
| 12 | Underside |
| 2 | Upper part |
| 22 | First latching-in element (connection to lower part) |
| 24 | First tilting element (connection to lower part) |
| 243 | Overlapping region |
| 25 | Third tilting element (connection to protective device) |
| 26 | First web |
| 27 | Opening |
| 28 | Second web |
| 3 | Lower part |
| 32 | Second latching-in element (connection to upper part) |
| 320 | Distance |
| 33 | Third latching-in element (connection to protective device) |
| 34 | Second tilting element (connection to upper part) |
| 36 | Edge |
| 4 | Protective device |
| 42 | Electrical contact |
| 43 | Fourth latching-in element (connection to lower part) |
| 45 | Fourth tilting element (connection to upper part) |
| 5 | Busbar |
| 52, 52', 52" | Main busbar |
| 54, 54' | Auxiliary busbar |
| 56 | Neutral conductor |

What is claimed is:

1. A plug-in system for a plurality of protective devices having electrical contacts, comprising:
   a lower part on an underside, wherein the lower part includes busbars; and
   an upper part on a top side arranged opposite the underside, wherein the upper part is made of electrically insulating material and is releasable from the lower part in a non-destructive manner,
   wherein the upper part has openings through which the electrical contacts of the protective devices make direct contact with the busbars, and the openings enable the plug-in system to be shockproof to IP XXB on the top side, and
   wherein the upper part and lower part are latchable into one another or are screwable to one another in such a manner that the upper part is releasable from the lower part only from the underside of the plug-in system.

2. The plug-in system as claimed in claim 1, wherein the upper part has first webs in a plane of the top side, such that at least one busbar is partially or completely coverable by the first webs of the upper part.

3. The plug-in system as claimed in claim 2, wherein the first webs are formed such that a protective device makes lateral contact with at least one partially coverable busbar.

4. The plug-in system as claimed in claim 1, wherein the upper part has second webs which are arranged in a plane perpendicular to the top side and are arranged between two respective busbars.

5. The plug-in system as claimed in claim 1, wherein the upper part has a first latching-in element and the lower part has a second latching-in element for latching the upper part to the lower part, these latching-in elements being arranged and configured such that the upper part is releasable from the lower part only from the underside of the plug-in system.

6. The plug-in system as claimed in claim 5, wherein at least one of the first and second latching-in elements is in the form of an latching-in lug which is latchable to the other latching-in element as a further latching-in lug or clip.

7. The plug-in system as claimed in claim 1, wherein the upper part has a first tilting element and the lower part has a second tilting element which interact in such a manner that the upper part is tiltable with respect to the lower part.

8. The plug-in system as claimed in claim 7, wherein the upper part has a third tilting element and the protective device has a fourth tilting element which interact in such a manner that the protective device is tiltable with respect to the upper part.

9. The plug-in system as claimed in claim 1, wherein the lower part has a third latching-in element and the protective device has a fourth latching-in element, the third and fourth latching-in elements are latchable into one another.

10. The plug-in system as claimed in claim 1, wherein the upper part has a fifth latching-in element and the protective device has a sixth latching-in element which interact such that the protective device is latchable to the upper part.

11. The plug-in system as claimed in claim 1, wherein the lower part has a fifth tilting element and the protective device has a sixth tilting element which interact in such a manner that the protective device is tiltable with respect to the lower part.

12. The plug-in system as claimed in claim 1, wherein the upper part has a first latching-in element and the lower part has a second latching-in element for latching the upper part to the lower part, in that the lower part has a lateral edge which is at a distance from the second latching-in element, and a minimum distance between the upper part and the lower part in a region between the second latching-in element and the edge is a maximum of 5 mm.

13. The plug-in system as claimed in claim 1, wherein the upper part has a first tilting element and the lower part has a second tilting element which interact in such a manner that the upper part is tiltable with respect to the lower part, and in that the first tilting element of the upper part is configured such that it overlaps the second tilting element of the lower part at least by an overlapping region of 3 mm.

14. The plug-in system as claimed in claim 2, wherein the upper part has second webs which are arranged in a plane perpendicular to the top side and are arranged between two respective busbars.

15. The plug-in system as claimed in claim 2, wherein the upper part has a first latching-in element and the lower part has a second latching-in element for latching the upper part to the lower part, wherein the latching-in elements are arranged and configured such that the upper part is releasable from the lower part only from the underside of the plug-in system.

16. The plug-in system as claimed in claim 5, wherein the upper part has a third tilting element and the protective device has a fourth tilting element which interact such that the protective device is tiltable with respect to the upper part.

17. The plug-in system as claimed claim 5, wherein the lower part has a third latching-in element and the protective device has a fourth latching-in element, the third and fourth latching-in elements are latchable into one another.

18. The plug-in system as claimed in claim 17, wherein the upper part has a fifth latching-in element and the protective device has a sixth latching-in element which interact in such a manner that the protective device is latchable to the upper part.

19. The plug-in system as claimed claim 5, wherein the lower part has a third latching-in element and the protective device has a fourth latching-in element, the third and fourth latching-in elements are latchable into one another.

20. An upper part of a plug-in system for a plurality of protective devices having electrical contacts, wherein the plug-in system includes a lower part on an underside and the lower part includes busbars, the upper part comprising:
   electrically insulating material,
   wherein the upper part is latchable into the lower part or is screwable to the lower part, such that the upper part is releasable from the lower part only from the underside of the plug-in system,
   wherein the upper part is on a top side of the plug-in system arranged opposite the underside,
   wherein the upper part has openings through which the electrical contacts of the protective devices make direct contact with the busbars, and the openings enable the plug-in system to be shockproof to IP XXB on the top side, and
   wherein the upper part is releasable from the lower part in a non-destructive manner.

* * * * *